3,418,365
PROCESS FOR THE PRODUCTION OF BETA-
CHLORO ACYL CHLORIDES
Carl G. Gustafson, Ossining, N.Y., assignor to Union
Carbide Corporation, a corporation of New York
No Drawing. Filed June 27, 1966, Ser. No. 560,843
8 Claims. (Cl. 260—544)

ABSTRACT OF THE DISCLOSURE

An improved process for producing appreciable yields of substantially pure beta-chloro acyl chlorides by the reaction of beta-lactones with thionyl chloride which comprises employing technical grade reactants in the absence of a catalyst at a temperature above about 100° C. In accordance with the teachings of the prior art, reaction between beta-lactones and thionyl chloride to produce relatively high yields of substantially pure beta-chloro acyl chlorides can be made to proceed only by employing (1) chemically pure reactants, or (2) technical grade reactants in conjunction with a strong acid catalyst.

---

This invention relates to an improved process for producing beta-chloro acyl chlorides by the reaction of beta-lactones with thionyl chloride.

In U.S. Patent 2,411,875 to Thomas L. Gresham and Forrest W. Shaver, it is disclosed that beta-halo acyl halides can be prepared by the reaction of a beta-lactone with a halide of an inorganic oxy-acid anhydride containing at least two halogen atoms, such as thionyl chloride, according to the equation:

$$\begin{matrix} & R_2 & R_3 \\ & | & | \\ R_1-\!\!\!\!&C-\!\!\!\!&C-R_4 + MX_n \\ & | & | \\ & O-\!\!\!\!&C=O \end{matrix} \longrightarrow \begin{matrix} & R_2 & R_3 & O \\ & | & | & \| \\ R_1-\!\!\!\!&C-\!\!\!\!&C-\!\!\!\!&C-X + MO \\ & | & | \\ & X & R_4 \end{matrix}$$

wherein $MX_n$ represents the halide of an inorganic oxy-acid anhydride containing at least two halogen atoms, and $R_1$, $R_2$, $R_3$ and $R_4$ represent hydrogen or an organic residue linked to the carbon atoms such as aryl, aralkyl, or alkylaryl groups.

In U.S. Patent 2,548,161 to Jacob Eden Jansen and Warren L. Beears, it is further disclosed that the reaction of a beta lactone with thionyl chloride to produce a beta-chloro acyl chloride proceeds in the manner described in U.S. Patent 2,411,875 only when chemically pure (C.P. grade) thionyl chloride and beta-lactone are utilized, and that when technical grade reactants are used the reaction product is a tarry mass from which the quantity of beta-chloro acyl chloride obtained is quite small (less than one percent). To overcome this problem and permit the use of technical grade reactants, Jansen and Beears suggest that technical grade beta-lactone be added to technical grade thionyl chloride while maintaining the temperature of the resulting mixture below 30° C., thereafter adding a strong acid catalyst to the reaction mixture, and heating the reaction mixture to volatilize sulfur dioxide and complete the reaction. Relatively high yields of substantially pure beta-chloro acyl chlorides are said to be obtained in this manner. The reaction is said to proceed substantially according to the equation:

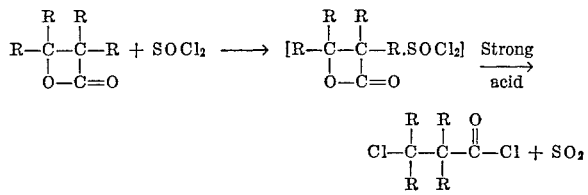

wherein each R is hydrogen or an organic residue such as alkyl, aryl, aralkyl or alkylaryl groups, and the compound within the brackets is an unisolated intermediate. Thus, in accordance with the teachings of the prior art, reaction between a beta-lactone and thionyl chloride to produce relatively high yields of substantially pure beta-chloro acyl chloride can be made to proceed employing either chemically pure reactants or technical grade reactants in conjunction with a strong acid catalyst. No method for producing appreciable yields of substantially pure beta-chloro acyl chlorides from technical grade beta-lactones and thionyl chloride without the necessity of employing a strong acid catalyst has been devised up to the present time. Now, however, in accordance with the instant invention, it has been discovered that reaction between a beta-lactone and thionyl chloride to produce appreciable yields of substantially pure beta-chloro acyl chloride can be made to proceed employing technical grade reactants in the absence of a catalyst if the reaction is conducted at a temperature above about 100° C. This is entirely unexpected as a tarry mass is obtained as the main product when the reaction is conducted at lower temperatures. Furthermore, by operating at the higher temperatures, reaction can be effected in a fraction of the time required by the prior art methods. The reaction takes place according to the equation:

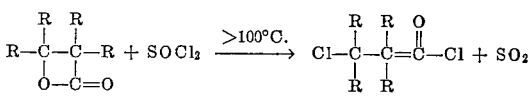

wherein each R is hydrogen or an organic residue such as alkyl, aryl, aralkyl or alkylaryl groups.

According to the process of the instant invention technical grade thionyl chloride is mixed with technical grade beta-lactone and the mixture is heated at a temperature above about 100° C. Temperatures in excess of about 200° C. are usually not desirable as decomposition of the beta-lactone begins to occur at such temperatures. This decomposition can be eliminated, however, by conducting the reaction under sufficient pressure to maintain the thionyl chloride in the liquid state.

Although one mole of beta-lactone reacts with one mole of thionyl chloride to produce one mole of beta-chloro acyl chloride, it is nevertheless desirable to utilize an excess of thionyl chloride, for example, from about 1.5 to about 3 moles for each mole of beta-lactone to be utilized.

The process of the instant invention can be conducted in a continuous, semi-continuous, or batchwise manner. Preferably, reaction is conducted by admixing the beta-lactone and thionyl chloride and passing the admixture through a tubular reactor maintained at the desired reaction temperature. The required residence time is related to the reaction temperature, with longer residence times required at lower temperatures. The reaction time is not narrowly critical, however, and generally residence times of from about 4 to about 10 minutes are satisfactory.

After the reaction is complete, the beta-chloro acyl chloride is recovered and purified by distillation.

The following examples are set forth for purposes of illustration so that those skilled in the art may better understand this invention, and it should be understood that they are not to be construed as limiting this invention in any manner.

EXAMPLE 1

Technical grade thionyl chloride and beta-propiolactone were admixed in a 1.7:1 molar ratio and the admixture was immediately passed downward through a vertical quartz tube maintained at a temperature of 150° C. The tube employed was 12 inches long and 1 inch in inner diameter and was packed with ⅛-inch glass helices. The admixture passed through the tube at a rate which provided an average residence time of 7 minutes. The effluent which emerged from the tube was condensed at 85° C.

The condensate was distilled and a 49 percent yield of beta-chloropropionyl chloride was recovered at a boiling point of 60–65° C. at 45 mm. of mercury.

EXAMPLE 2

One milliliter of technical grade beta-propiolactone was mixed with two milliliters of technical grade thionyl chloride in a reaction tube. The tube was immediately sealed and heated for five minutes at a temperature of 200° C. Vapor phase chromatographic analysis indicated that all the beta-propiolactone had been consumed and only one product was formed, i.e., beta-chloropropionyl chloride.

When other beta-lactones of the type disclosed hereinabove are reacted with technical grade thionyl chloride in accordance with the method of this invention, beta-chloro acyl chlorides are also obtained in good yields. For example, beta-butyrolactone reacts with thionyl chloride to give beta-chloro-butyryl chloride, and beta-phenyl-beta-propiolactone reacts with thionyl chloride to give beta-chloro-beta-phenyl propionyl chloride.

What is claimed is:

1. In a process for preparing beta-chloro acyl chlorides by the reaction of a beta-lactone with thionyl chloride, the improvement which comprises employing technical grade reactants and conducting the reaction in the absence of a strong acid catalyst at a temperature above 100° C.

2. A process as in claim 1 wherein the beta-lactone is beta-propiolactone.

3. A process as in claim 1 wherein the reaction is conducted at a temperature of from 100° C. to 200° C.

4. A process as in claim 3 wherein the beta-lactone is beta-propiolactone.

5. A process as in claim 1 wherein the reaction is conducted under a pressure sufficient to maintain the thionyl chloride in the liquid state.

6. A process as in claim 5 wherein the beta-lactone is beta-propiolactone.

7. A process as in claim 3 wherein the reaction is conducted under a pressure sufficient to maintain the thionyl chloride in the liquid state.

8. A process as in claim 7 wherein the beta-lactone is beta-propiolactone.

References Cited

UNITED STATES PATENTS

| | | | |
|---|---|---|---|
| 2,411,875 | 12/1946 | Gresham et al. | 260—544 |
| 2,548,161 | 4/1951 | Jansen et al. | 260—544 |

LORRAINE A. WEINBERGER, *Primary Examiner.*

J. H. NIELSEN, *Assistant Examiner.*